United States Patent
Price et al.

(10) Patent No.: US 7,119,762 B2
(45) Date of Patent: Oct. 10, 2006

(54) METHOD AND APPARATUS FOR SELECTIVELY VIEWING CAPTIONING

(76) Inventors: Jeremy C. Price, 2180 E. Warm Springs Rd. # 1070, Las Vegas, NV (US) 89119; David P. Shelton, 2646 White Pine Dr., Henderson, NV (US) 89074

( * ) Notice: Subject to any disclaimer, the term of this patent is extended or adjusted under 35 U.S.C. 154(b) by 0 days.

(21) Appl. No.: 10/223,003

(22) Filed: Aug. 19, 2002

(65) Prior Publication Data
US 2004/0032379 A1 Feb. 19, 2004

(51) Int. Cl.
*G09G 5/00* (2006.01)

(52) U.S. Cl. ............ 345/7; 345/8; 345/9; 345/156

(58) Field of Classification Search ............ 345/7–9, 345/156, 158, 87, 419; 348/742, 750, 743, 348/758; 359/309, 23, 277, 26, 1, 15, 19, 359/630; 349/78, 5; 364/525; 438/166, 438/479
See application file for complete search history.

(56) References Cited

U.S. PATENT DOCUMENTS

| | | | |
|---|---|---|---|
| 3,829,838 A * | 8/1974 | Lewis et al. | 345/419 |
| 4,855,961 A * | 8/1989 | Jaffe et al. | 367/7 |
| 5,031,122 A * | 7/1991 | Witty | 346/107.2 |
| 5,294,940 A * | 3/1994 | Wennagel et al. | 345/31 |
| 5,617,243 A * | 4/1997 | Yamazaki et al. | 359/309 |
| 5,706,061 A * | 1/1998 | Marshall et al. | 348/743 |
| 5,784,181 A * | 7/1998 | Loiseaux et al. | 359/1 |
| 5,790,084 A * | 8/1998 | Hix et al. | 345/7 |
| 5,886,675 A * | 3/1999 | Aye et al. | 345/7 |
| 5,990,983 A * | 11/1999 | Hargis et al. | 348/758 |
| 6,005,536 A * | 12/1999 | Beadles et al. | 345/7 |
| 6,407,724 B1 * | 6/2002 | Waldern et al. | 345/8 |
| 6,476,943 B1 * | 11/2002 | Yertoprakhov | 359/15 |
| 6,567,173 B1 * | 5/2003 | Johannesen | 356/480 |
| 6,583,772 B1 * | 6/2003 | Lewis et al. | 345/7 |
| 6,614,407 B1 * | 9/2003 | Perlman | 345/7 |
| 6,707,516 B1 * | 3/2004 | Johnson et al. | 349/78 |
| 2001/0043166 A1 * | 11/2001 | Jacobsen et al. | 345/27 |
| 2002/0054402 A1 * | 5/2002 | Klug et al. | 359/23 |
| 2002/0146873 A1 * | 10/2002 | Tanaka | 438/166 |
| 2003/0151785 A1 * | 8/2003 | Vertoprakhov | 359/15 |
| 2005/0018308 A1 * | 1/2005 | Cassarly et al. | 359/630 |

* cited by examiner

*Primary Examiner*—Bipin Shalwala
*Assistant Examiner*—Prabodh Dharia
(74) *Attorney, Agent, or Firm*—Gerald L. Price

(57) ABSTRACT

Alphanumeric images are displayed in common view in one color on a background of a different color using a liquid crystal projection device. The two colors are sufficiently similar so they are not distinguished by the unaided eye of the viewer. A color selective material in the form of glasses is provided to a subclass of the viewers in the audience to enable these viewers to distinguish the alphanumeric subtitles from the background. This material extinguishes either the alphanumeric images or the background, thereby either providing darkened letters on a light background or light letters on a darkened background. The projection and viewing apparatus can be utilized as a motion picture closed captioning system for a mixed audience of hearing impaired and non hearing impaired individuals to permit the hearing impaired to view the subtitles while those individuals not wearing such wavelength selective glasses would not see the subtitles.

18 Claims, 1 Drawing Sheet

METHOD AND APPARATUS FOR SELECTIVELY VIEWING CAPTIONING

BACKGROUND OF THE INVENTION

It is estimated that throughout the world there are millions of people that suffer some degree of hearing impairment ranging from mild loss to total deafness. Such conditions are attributed to genetics, accident, disease and environmental conditions including work related.

In order to accommodate the deaf and significantly hearing impaired the motion picture industry has provided motion pictures with captioning which is the display of the audio text of the motion picture projected usually at the bottom of the screen.

Captioning has been well known in the motion picture industry and dates back to the days of silent movies and later the famous bouncing ball sing along shorts. Captioning is also utilized in connection with motion pictures to display a foreign language translation and to display various captions as part and parcel of a motion picture. While captions integral with the projected image work well for delivering the audio portion of a motion picture to those who are not able to hear it, there is a substantial reluctance of motion picture studios and exhibitors to provide captions on regularly distributed pictures. The primary reason is that it has been found that audiences without hearing impairment find such captions a distraction.

There have been a number of attempts to provide a caption of the audio portion of a motion picture that cannot be seen by the hearing audience and while some of them have provided this objective, they have not been commercially accepted for various reasons.

U.S. Pat. No. 4,859,994 to Zola utilizes polarized eyeglasses of the type used in stereographic (3D) projection systems where each eye views a different projected image, However, the device disclosed in Zola requires a 50 foot wide LCD (liquid crystal display) screen which would be financially prohibitive to many smaller theater owners. It also would require the theater to be refitted with a polarization preserving screen. U.S. Pat. No. 5,793,470 to Haseltine et. al. utilizes an LCD projector to project a polarization encoded image onto a polarization preserving screen and viewing it with polarized glasses. There are substantial problems in reducing this method to commercial practice since polarized filtered light has to be substantially brighter than ordinary projection levels due to the filtering.

The prior art also includes eyeglasses with individual text generators such as in U.S. Pat. Nos. 5,793,470 and 6,005,536 but at present such equipment would not be economical and the weight has found to be uncomfortable to many users. There have also been prismatic glasses where the caption would be projected on the ceiling or rear wall of the theater and viewed with a prism or mirror arrangement. These systems have not been well received since alignment is a problem and some viewers have experienced headaches and eyestrain.

SUMMARY OF THE INVENTION

It is the general aim of the present invention to provide a new and improved method and apparatus for displaying captions in conjunction with the exhibition of a motion picture whereby such captions are only seen by those desiring to see same.

In the present invention, use is made of closely spaced light wavelengths that are indistinguishable to the naked eye whereby captions can be viewed using a filter which only passes one of the two wavelengths. The viewing can be accomplished by special viewing glasses which would have lenses such as bifocals with the captioned part viewed through one portion and the main picture viewed through the other. It is also possible to achieve the objects of the present invention utilizing singular lenses.

BRIEF DESCRIPTION OF THE DRAWING

Additional objects and advantages of the invention will appear from the following description taken in conjunction with the accompanying drawing in which.

Figure 1:
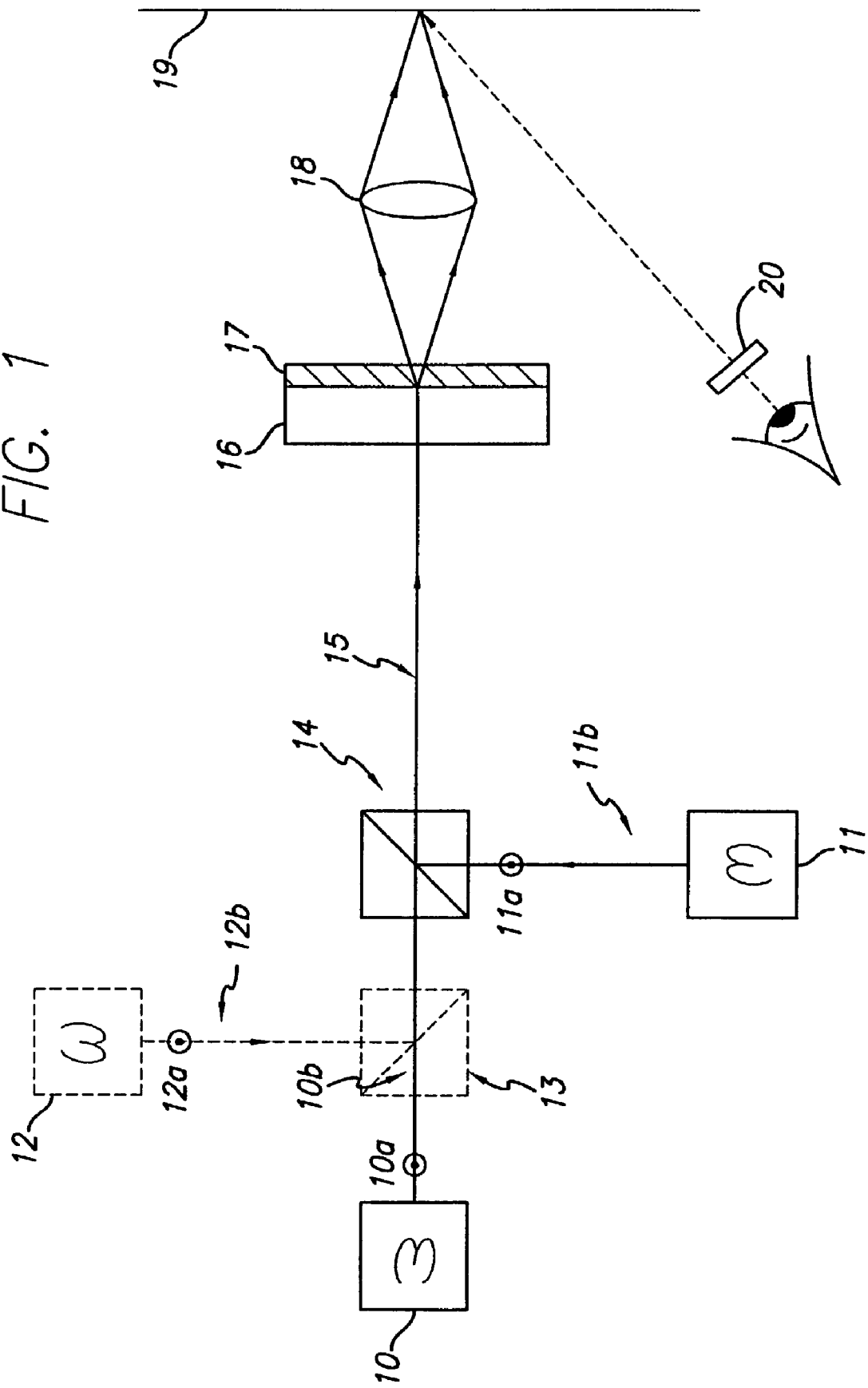
FIG. 1 is a diagram of a selective caption viewing apparatus embodying the features of the present invention.

While the present invention is susceptible of various modifications and alternative constructions, illustrative embodiments are shown in the drawings and will herein be described in detail. It should be understood however, that it is not to be intended to limit the invention to the particular forms disclosed, but, on the contrary, the intention is to cover all modifications, equivalents, and alternative construction falling within the spirit and scope of the invention as expressed in the appended claims.

DESCRIPTION OF THE PREFERRED EMBODIMENT

In the preferred embodiment monochromatic light at two closely spaced wavelengths is utilized. The preferred source for such light is laser 10 with a first wavelength 10*a* and laser 11 with a second wavelength 11*a*. Laser beam 10*b* is vertically polarized and laser beam 11*b* is horizontally polarized. As shown in FIG. 1, the beams 10*b* and 11*b* from said lasers, orthogonally polarized, are combined using a polarizing beam splitter 14. The resulting combined beam 15 which comprises beams 10*b* and 11*b* illuminate liquid crystal display 16 which does not have a polarizer at its input face. While orthogonality of the polarizations are essential, the choices of vertical and horizontal polarizations were merely for the sake of convenience. The pixels of the LCD 16 that are on rotate the light by 90 degrees while the pixels that are off do not change the polarization of the light. The light then passes through a polarizer 17 at the output face of the LCD 16 which is oriented to only pass vertically polarized light. Accordingly, off pixels transmit wavelength 10*a* and the activated or on pixels transmit wavelength 11*a*. A lens 18 images the two color liquid crystal display onto the viewing screen 19. The wavelength difference between 10*a* and 11*a* is small enough that the two colors cannot be distinguished by the unaided eye. The projected image is viewed by use of a wavelength selective filter 20 which transmits only one of the two light wavelengths in the image.

The permissible wavelength difference is smallest in the yellow-green part of the visible spectrum making the viewing apparatus complex. However, yellow-green light is the most visible which in turn minimizes the amount of light power required. Lasers meeting the within requirements are of the frequency-doubled diode-pumped solid state type and are compact and adequately powerful but relatively expensive. In order to substantially reduce the cost of the lasers, an alternative is to use red light which allows a large wavelength difference and can be obtained relatively inexpensively but this advantage may be negated since low visibility in the red light range requires about 100 times more light power for adequate visibility.

As heretofore stated, to view the projected image on the screen 19, a wavelength selective filter 20 is used which transmits one wavelength and attenuates the other. There are several types of filters available which meet this requirement including absorptive filters, interference filters, and holographic notch filters. Absorptive filters are generally the least expensive but are the least selective. Interference band-pass filters are available with adequate selectivity. Both absorptive and interference band-pass filters would more than likely be unsuitable for viewing the main projected image since most of the light would be blocked. They can however, be utilized in an eyeglass construction where only a small portion of the lens, preferably at the bottom, would be utilized for viewing th caption.

The preferred embodiment of the invention would be utilize holographic notch filters since only a very narrow range of wavelengths would be blocked. Accordingly, both the main image and the captions could be viewed through the same filter which would appear transparent and colorless. While holographic filters are considerably more expensive than the others referred to above, a high performance type of holographic notch filter is not required for the instant application. Therefor, it appears that an adequate holographic notch filter can be mass produced at an economically viable cost.

It has also been found that adding a third wavelength allows the improvement of the color matching while relaxing the required spectral selectivity of the viewing filter. For example, if there is a beam 12b of a third laser 12 with wavelength 12a added to the makeup of composite beam 15, the alphanumeric display would be written with the light of beams 10b and 12b, and the background wold be applied from wavelength 11a which would be about halfway between the other two. This could be accomplished by an arrangement whereby beam 10b and beam 12b are combined utilizing a dichronic beam splitter 13 and the resulting beam is combined with beam 11b utilizing a polarizing beam splitter 14.

What we claim is:

1. An apparatus for projecting onto a screen means viewable by a plurality of persons a display including alphanumeric images which can be viewed only by selected persons, the apparatus comprising:
   first laser means emitting a first polarized beam at a first visible wavelength,
   second laser means emitting a second polarized beam at a second visible wavelength,
   one of said first and second polarized beam forming alphanumeric images, and said first and second visible wavelengths being sufficiently close that a color difference therebetween cannot be distinguished by the unaided eye,
   polarizing beam splitting means for combining said first and second beams, the combined beams being emitted in the same direction with orthogonal polarization orientation,
   liquid crystal display means for displaying a selected alphanumeric image having a first surface for receiving said combined beams and a second surface provided with a polarizing means for outputting only vertically polarized light, and
   lens means for projecting said light passed through said second surface onto the screen means,
   wherein the alphanumeric images can be seen only by selected persons wearing a wavelength selective filter adjacent the eyes.

2. The apparatus as set forth in claim 1, wherein the polarization of the beam emitted from said first laser means is vertical.

3. The apparatus as set forth in claim 2, wherein the polarization of the beam emitted from said second laser means is horizontal.

4. The apparatus set forth in claim 1, wherein said first and second laser means produce wavelengths in a yellow-green part of the visible spectrum.

5. The apparatus set forth in claim 1, further including third laser means emitting a vertically polarized beam at a third visible wavelengths, with the second visible wavelength being about halfway between said first and third visible wavelength, and dichroic beam splitting means for combining the first and third visible beams which are then combined with the beam from said second laser means by said polarizing beam splitting means,
   whereby the alphanumeric image is projected by the beams from said first and third laser means and a background is projected by the beam from said second laser means and the viewing means transmits only the beams projecting said image.

6. The apparatus set forth in claim 3, further including third laser means emitting a vertically polarized beam with a third visible wavelength, with the second wavelength being about halfway between said first and third wavelengths, and dichroic beam splitting means for combining the first and third beams, which are then combined with the beam from said second laser means,
   whereby the alphanumeric image is projected by the beams from said first and third laser means and a background is projected by the beam from said second laser means and the viewing means transmits only the beams projecting said image.

7. In combination, the apparatus as set forth in claim 1, and a wavelength selective filter constructed and arranged for mounting adjacent the eyes of a viewer.

8. The combination set forth in claim 7, wherein said wavelength selective filter is a holographic notch filter.

9. The apparatus set forth in claim 7, wherein said wavelength selective filter is mounted in an eyeglass type frame.

10. A method of projecting alphanumeric displays onto a screen viewable by a plurality of persons, where the displays are viewable only by selected persons, comprising the steps of:
    providing a first polarized laser beam at a first visible wavelength;
    providing a second polarized laser beam at a second visible wavelength,
    wherein one of the first polarized beams forms alphanumeric images and the first and second wavelengths are sufficiently close that a color difference therebetween cannot be distinguished by the unaided eye,
    passing said first and second beams through a polarizing beam splitter to combine said first and second beams;
    passing said combined beams through a liquid crystal display with input and output sides having the selected alphanumeric image inputted thereto, with polarizing means at the output side thereof,
    passing the beam from the liquid crystal display through a lens means for projecting a resulting image onto the screen viewable by a plurality of persons, and providing viewing means comprising a wavelength selective filter to selected persons for viewing the one of said first and second wavelengths containing image.

11. The method as set forth in claim 10, wherein the polarization of said beam emitted from said first laser means is vertical.

12. The method as set forth in claim 11, wherein the polarization of said beam emitted from said second laser means is horizontal.

13. The method set forth in claim 10, wherein said laser means produce wavelengths in the yellow-green part of the visible spectrum.

14. The method set forth in claim 10, wherein said wavelength selective filter is a holographic notch filter.

15. The method set forth in claim 10, wherein said viewing means include an eyeglass type frame.

16. The method set forth in claim 10, further including a third laser means emitting a polarized beam at third wavelength with the second wavelength being about halfway between said first and third wavelengths, and combining the third beam with the first beam by dichroic beam splitting means, and then combining the combined first and third beams with the beam from said second laser producing means by said polarizing beam splitting means, whereby the alphanumeric image is projected by the beams from said first and third laser producing means and a background is projected by the beam from said second laser producing means, said viewing means only transmitting those beams projecting said image.

17. The method set forth in claim 12, further including a third laser means emitting a polarized beam at third wavelength with the second wavelength being about halfway between said first and third wavelengths, and combining the third beam with the first beam by dichroic beam splitting means, and then combining the combined first and third beams with the beam from said second laser producing means by said polarizing beam splitting means, whereby the alphanumeric image is projected by the beams from said first and third laser producing means and a background is projected by the beam from said second laser producing means.

18. The method set forth in claim 10, wherein said viewing means transmits said first and third wavelengths.

* * * * *